Patented Dec. 5, 1933

1,937,995

UNITED STATES PATENT OFFICE 1,937,995

PROCESS FOR THE SEPARATION AND RECOVERY OF THE CONSTITUENTS OF SEA WATER

Alfred M. Thomsen, San Francisco, Calif.

No Drawing. Application February 21, 1930
Serial No. 430,460

4 Claims. (Cl. 23—217)

This invention relates to a process for the treatment of sea water whereby the same may be so modified that multiple effect evaporating equipment may be safely employed in its evaporation. The soda, potash, magnesia, and lime, present as sulphates and chlorides, are thus obtained in solid form, in part combined with one another, while the two remaining constituents, e. g., water and bromine, are obtained in the liquid state.

The treatment of sea water, as here indicated, is rendered exceedingly difficult by the great dilution of the raw material itself, i. e., total salts rarely exceed 3½%; the character of the composite salts; and the presence of impurities. Even the brightest and clearest sea water teems with organic life, and the decay products of such life, together with microscopic shells and finely divided clayey matter.

Magnesium chloride breaks up at very moderate temperatures forming corrosive hydrochloric acid and precipitating insoluble salts upon the evaporator tubes. Its presence in such a sensitive apparatus as a multiple effect evaporator is therefore most undesirable. While calcium sulphate is without corrosive effect nevertheless it forms a hard flinty scale, and its presence is at least as objectionable, or even more so, as the magnesium chloride referred to. Yet the total weight of these salts in sea water is nearly twenty per cent. (20%) of the total salts present. Finally, we are confronted with the need of rigorous economy of fuel. In view of these facts it is easily seen why sea water is of no economic importance today, except at those scattered spots where climatic conditions permit the use of solar evaporation.

Before entering upon a discussion of my process, in which I overcome the above-mentioned difficulties, I desire to enumerate the equipment (all of standard type) employed by me in the actual practice of my invention. Such are:—a multiple effect evaporator and a boiler to supply steam for same, an atmospheric cooler in circuit with the condenser so that the condenser water may be cooled and reused, a counter-current heat interchanger so that the incoming sea water may be heated by the outgoing distilled water from the condenser, a "flame-type" evaporator in which the waste stack gases from the boiler may part with more heat to the already somewhat heated sea water, and, finally, tanks for settling out of precipitate, crystallizers, filters, and centrifugals.

An analysis of conditions shows that the quantity of distilled water discharged from the condenser is almost equal to the incoming sea water, or, as herein termed by me, "raw water". It is therefore capable of heating this "raw water" almost to its own temperature. I therefore commence my economies of heat by so using the effluent from the condenser. In the next step I use this water as condenser cooling water, and render this possible by interposing in the circuit an ordinary atmospheric cooler. In this apparatus the heat absorbed from the condensing steam is again dissipated as latent heat of evaporation, so considerable shrinkage in volume takes place, and the sea water leaves sensibly stronger in total salts than when it enters. Furthermore, this thorough aeration has a chemical effect upon the organic constituents. During this period, no difficulty is experienced in the use of "raw water" as the temperature cannot rise much over 100° F.

The sea water, treated as above-described, is next brought into intimate contact with the waste gases from the boilers. This is done by showering the water through the hot gases in an apparatus such as is usually designated a "flame-type" evaporator, in reality merely an enlargement of the boiler flue where the water forms a pool upon the bottom and is continually showered into the gas stream by means of a fan just touching the surface of the fluid. Here the water is raised almost to boiling, but as we transmit heat by direct contact, and not through a metallic wall, there is no difficulty from either scaling or corrosion.

Chemical treatment now commences. A small amount of a soluble hydroxide, the cheapest of which, of course, is lime, but I do not limit myself to this, is added and the precipitate of $Mg(OH)_2$ produced is separated by settling, or filtering, or both. Owing to its gelatinous character it envelopes all suspended impurities, which embrace the organisms which the heat has already killed as well as mineral matter, and the result is a clear purified sea water.

Up to this point the working of the process is not susceptible of material deviation, but from this point I may elect to follow one or two courses, which I shall refer to as "A" and "B". Under "A", I remove lime and magnesia together as a mixture of carbonates, by adding an alkaline carbonate to the purified sea water, and separating the precipitate formed thereby. The supernatant liquor, or filtrate, is now ready for evaporation, but simple as the step is it is complicated by the high cost of the chemical employed and that no market now exists for such a mixture of carbonates as it produces. Under exceptional circumstances of very cheap soda ash, or the finding of a market for the precipitate, it may find useful application. For this reason I elect in general to proceed under "B".

"B" is virtually a continuation of the formerly described purification. A soluble hydroxide, lime preferred because of cheapness, is added in quantity sufficient to precipitate all the magnesia as hydroxide, and this precipitate is separated. The clear solution resulting is now treated with a soluble salt of barium, preferably the chloride, and the resulting liquid is now free from all scale forming and corrosive substances, and is ready for evaporation.

It follows from these descriptions that a variation may be introduced by combining part of these steps in various forms, thus:—The purified sea water may be treated with a soluble hydroxide, for instance, lime, and the magnesium hydroxide separated. The magnesia free sea water may now be treated with an alkali carbonate and the lime contents, both that normally present and that introduced by the precipitant, before employed, removed as a precipitate of calcium carbonate. Likewise, if we proceed under "A", and for some special reason desire barium sulphate, we may add a soluble barium salt to the liquid left after the mixed carbonates have been separated. In either event the same result is achieved, e. g., a non-scaling, non-corrosive sea water for subsequent evaporation, though the chemical composition will manifestly vary.

Whether I work under "A" or "B", or the variation just mentioned, the procedure now becomes identical once more. The treated sea water must be evaporated, and for this purpose multiple effect apparatus can safely be used. If the boiler be operated at a pressure of between 80 and 100 lbs. gauge pressure, we have the accepted six effects, and still maintain a temperature differential of 30° F. between the effects, which is sufficient for rapid work. However, I here introduce another deviation from standard practice, to-wit: I use the treated water in the boiler, and I also feed the first effect of the evaporator with superheated sea water from the boiler as well. The water in the boiler cannot therefore become too concentrated as all of the sea water for the evaporator must pass through it.

In this manner the boiler becomes in reality the first effect of the system, so that I now make possible seven effects instead of six. Likewise, the circulating condenser water constitutes in effect an additional evaporating unit, contributing its share to the efficiency as well as capacity of the circuit. It is this systematic absorption of heat otherwise wasted, putting it to work, and then compounding it, that produces the immense economy.

Where waste heat of low intensity is available in close proximity to sea water, such as stack gases from a large industrial plant, this may constitute the sole source of heat. By showering the water, partly heated already by the condenser through the stack gases, it is raised to the boiling point, and most of this heat absorbed. We may then pass the water in a rapid stream through the first effect of the evaporator, and compound the "flash" steam generated in the first effect by using it in the lower vacuum effects. The somewhat cooled sea water issuing from the first effect is then returned to fresh contact with the waste gases, reheated to approximately 212° F., and again sent through the evaporator. We thus substitute the heat absorbed from waste gases for the boiler steam otherwise required, and secure another economy.

Efficiency as well as economy of construction will suggest that two types of multiple effect evaporators be employed for this work. Up to the point where salt will begin to crystallize out, a simple type designed only for evaporation will be employed and then a much smaller battery of "salting out" type evaporators will be used for finishing. The work done by the former will be some six or seven times that of the latter. One might compare it with the multiple effect evaporator and the vacuum pan of the sugar mill, the first for evaporation only, the second designed for boiling sugar to grain.

The evaporation of untreated sea water in open ponds leads to the formation of various complex double salts of potash, magnesia, and soda, and the use of the resultant "bitterns" is therefore only sporadically attempted. The use of the process here described is subject to no such difficulty. If we have proceeded directly under "A" all lime and magnesia salts have been removed, and there remains only the chlorides and sulphates of potash and soda, with the exception of a small amount of bromide. We may therefore continue the evaporation until nine-tenths or more of the common salt has been separated, e. g., until only very few percent of the original water remains, before it is necessary to interrupt the process. The mother liquor is now withdrawn from the evaporator, treated with chlorine in a standard type bromine still, for the separation and recovery of the bromine, and then cooled. In this manner a copious crystallization of Glaubers salt takes place, particularly if soda ash were the alkaline carbonate selected. These crystals are now separated from the mother liquor, in effect a strong solution of potassium chloride, and this is once more concentrated by evaporation until a crop of crystals of potassium chloride is produced.

If we proceed under "B", and if we select lime as the soluble hydroxide employed, the sea water, except for a little bromide as before, consists of little but the chloride of sodium potassium and calcium. As there are no sulphates present I may carry the evaporation even further than under "A". I may interrupt the process for the bromine separation, as before, and cool for the separation of potassium chloride, after which, on further evaporation, I obtain solid calcium chloride.

From the standpoint of weight the main constituent of sea water is of course water. With the exception of that lost by evaporation at the atmospheric cooler, and that dissolved in the stack gases, the total water is recovered from the condenser as pure distilled water, and this fact is of supreme importance to the process. A jet condenser which mixes this pure product with sea water should therefore never be employed, but a surface condenser instead. Washing of the various precipitates and crystals produced, or the further use of these in chemical manufacture, requires much pure water, and this is often difficult to obtain where undiluted sea water is abundant. Therefore, where the process itself produces the water required for these purposes this difficulty is eliminated.

It is axiomatic in chemical manufacture that any marketable product produced at a profit should be sold, is possible, in the condition in which it is obtained, and only after this market has been saturated should it be converted into other compounds, or returned to the process. It is evident, therefore, that the barium sulphate obtained under "B", or under a modification of "A" should be sold when possible as such, but unfortunately the demand for "blanc fixe" is small compared with the enormous consumption of soda and potash salts.

It is therefore necessary to consider a cyclic use of the barium sulphate produced. By heating the precipitate with carbon it is readily reduced to the water soluble sulphide. If this solution is now commingled with a part of the calcium chloride, which is the final residual salt obtained, upon evaporation of the barium treated sea water, then a precipitate of calcium sulphide, and a solution of barium chloride is obtained. The calcium sulphide is separated and the solution of barium chloride is returned to the circuit,—thus establishing a cycle. Losses in the process are made up by the addition of heavy spar.

As indicated in the discussion of modifications and combinations under "A" and "B", many minor deviations in this process are rendered possible, and I do not confine myself solely to the illustration used, which is only a preferred way introduced for the sake of clarity. It is evident that the introduction of the evaporation and crystallization steps, in combination with either "A" or "B", is subject to similar unimportant variations. I give as example: The bromine recovery step is best introduced where the mother liquor must be removed from the evaporator and cooled to induce a second crystallization, but it might be introduced anywhere from the start to the finish of the process, or even upon "raw sea water". If introduced before the place indicated above, losses of bromine will be larger and recovery costs higher, because working upon a more dilute solution, if later in the process some of the bromide will be lost with the crystals separated, e. g., potassium chloride.

Likewise, the whole of the sea water might be treated cold, and the various precipitates separated before heat was applied, and then evaporated, but as hot solutions settle and filter much better than cold ones, this would constitute no improvement, but quite the reverse. Here again I wish to indicate that I give only a preferred way which may be widely varied by placing one step either before or after another.

I claim:—

1. In the process of separating and recovering the various constituents of sea water, the step of removing suspended impurities by the addition of a soluble hydroxide, removing lime and magnesia jointly by means of an alkaline carbonate, partially concentrating the residual sea water by evaporation, passing chlorine into the concentrated sea water to recover the bromine therein, and continuing the evaporation step until all remaining salts have been recovered.

2. In the process of separating and recovering the various constituents of sea water, the step of removing suspended impurities by the addition of a soluble hydroxide, removing magnesia by an additive soluble hydroxide, adding an alkaline carbonate to obtain a precipitate of calcium carbonate, removing said precipitate, partially concentrating the residual sea water by evaporation, passing chlorine into the concentrated sea water to recover the bromine therein, and continuing the evaporation step until all remaining salts have been recovered.

3. In the process of separating and recovering the various constituents of sea water, the step of adding to a purified and magnesia free remainder of sea water a soluble halogen salt of barium in order to remove and recover sulphates contained therein, and obtaining the chlorides of sodium, potassium, and calcium, resident in the residual sea water, by evaporation.

4. In the process of separating and recovering the various constituents of sea water, the step of removing suspended impurities by the addition of a soluble hydroxide, removing magnesia by an additive soluble hydroxide, adding a soluble halogen salt of barium to obtain a precipitate of barium sulphate, removing said precipitate, partially concentrating the residual sea water by evaporation, passing chlorine into the concentrated sea water to recover the bromine therein, and continuing the evaporation step until all remaining salts have been recovered.

ALFRED M. THOMSEN.